May 18, 1943. O. W. GITHENS ET AL 2,319,318
INTERMITTENT FILM FEED
Original Filed June 3, 1937 2 Sheets-Sheet 1
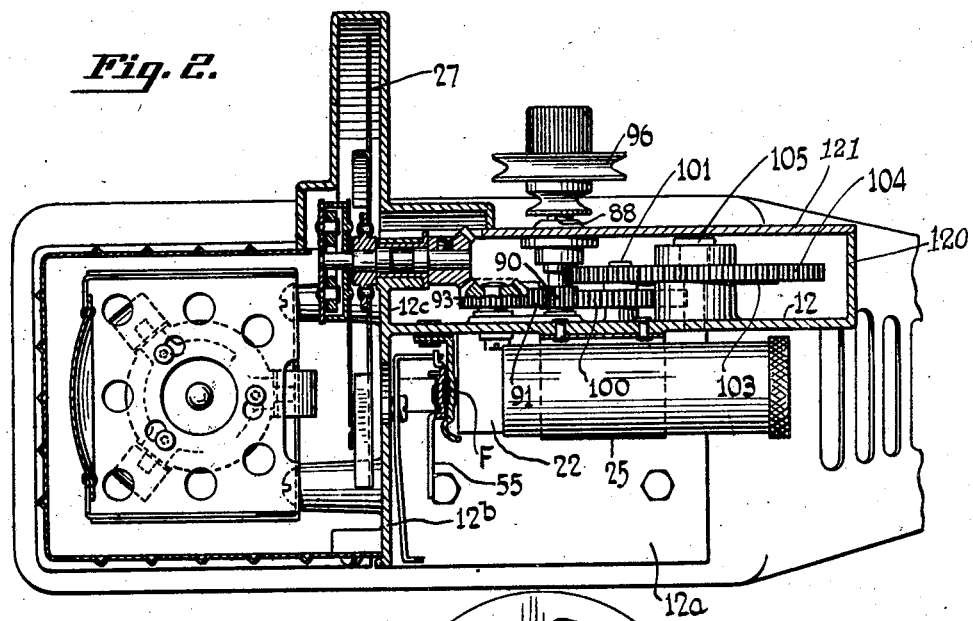
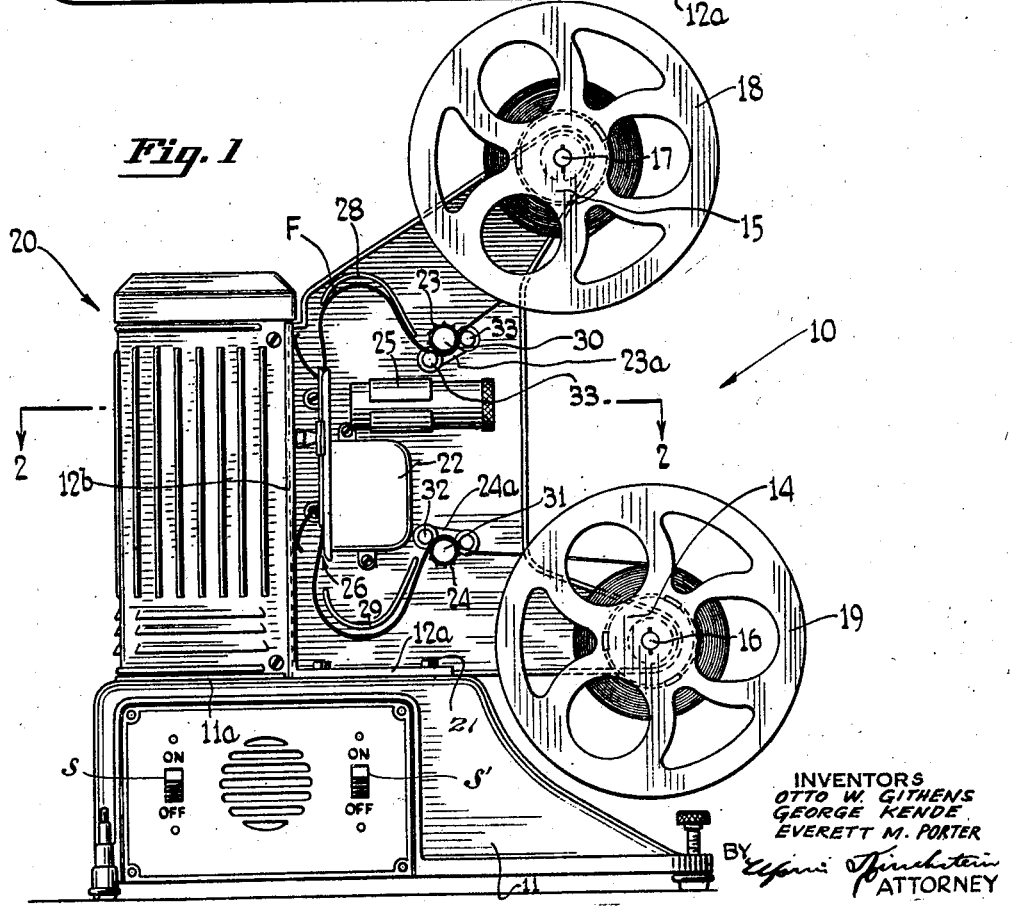
INVENTORS
OTTO W. GITHENS
GEORGE KENDE
EVERETT M. PORTER
BY
ATTORNEY

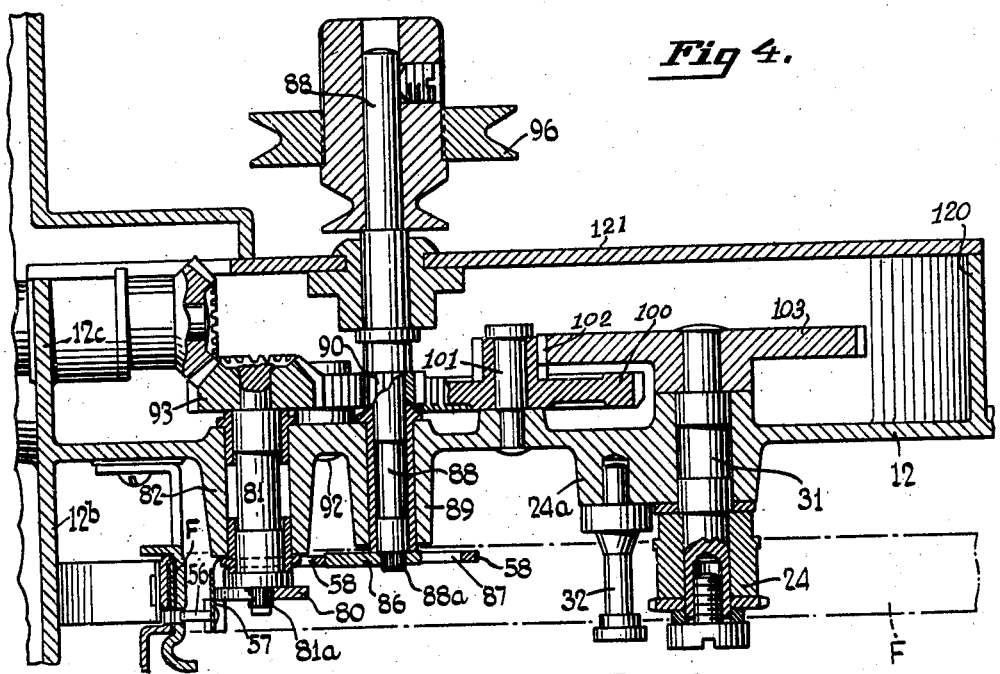
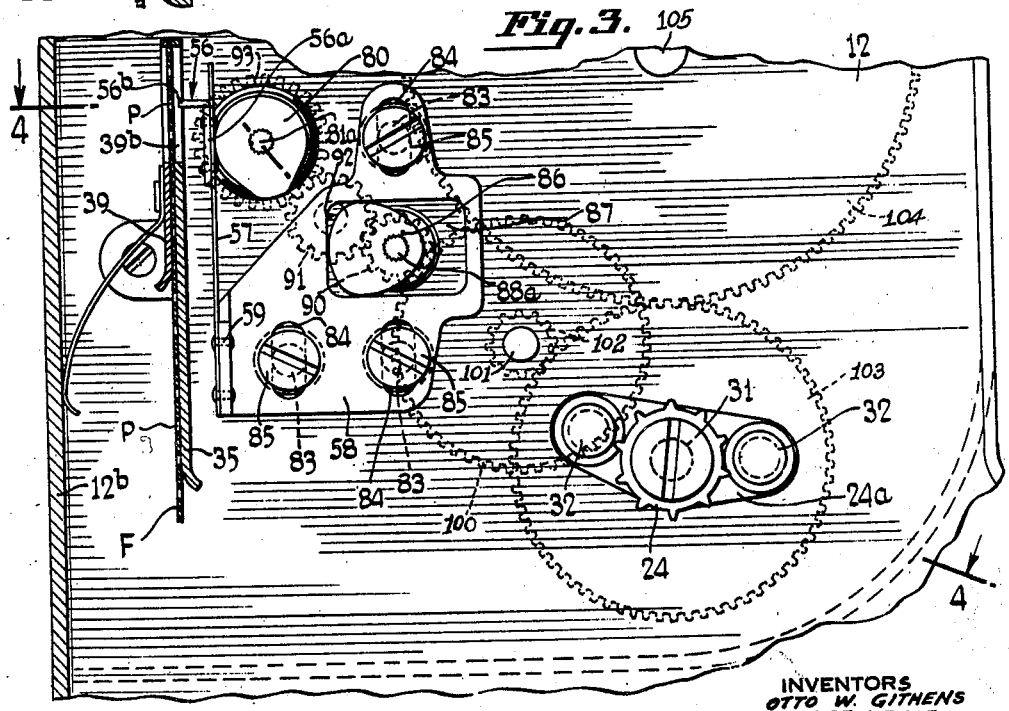

Patented May 18, 1943

2,319,318

UNITED STATES PATENT OFFICE 2,319,318

INTERMITTENT FILM FEED

Otto W. Githens and George Kende, New York, N. Y., and Everett M. Porter, Brooklyn, N. Y., assignors to Universal Camera Corporation, New York, N. Y., a corporation of Delaware Original application June 3, 1937, Serial No. 146,182. Divided and this application December 21, 1939, Serial No. 310,343

6 Claims. (Cl. 88—18.4)

This invention relates generally to motion picture projectors, and has for one of its objects the provision of a motion picture projector having an improved intermittent film advancement mechanism which is characterized by its simplicity and efficiency of operation.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

Certain features shown and described but not claimed in this application are shown, described, and claimed in our copending application, Serial No. 146,182, filed June 3, 1937, for Motion picture projectors, now Patent No. 2,190,658, of which the present application is a divisional application.

In the accompanying drawings, in which is shown one of the various possible embodiments of this invention, Fig. 1 is a side elevational view of a motion picture projector embodying our invention;

Fig. 2 is an enlarged cross-sectional view taken substantially on the line 2—2 of Fig. 1;

Fig. 3 is an enlarged detail, partly sectional, of a portion of the mechanism of the projector shown in Fig. 1; and Fig. 4 is a cross-sectional view taken substantially on the line 4—4 of Fig. 3.

Referring now in detail to the drawings, we have disclosed a motion picture projector 10 constructed in accordance with our invention and embodying certain novel constructional features hereinbefore mentioned and which will now be described in detail.

As shown in Fig. 1, the projector 10 comprises a base 11, which is adapted to house an electric motor of usual construction, a pair of switches S and S', a ventilating fan, and a transformer, all of which are not shown in the present application, but which are shown and described in our said copending application, Serial No. 146,182. Attached to the top wall 11a of the base 11 is a main supporting frame 12, substantially rectangular in shape and having integrally cast extensions or reel arms 14 and 15. The reel arms 14 and 15 may be provided with integrally cast bearing brackets, into which there is journalled the shafts 16 and 17, which are designed to receive thereon for rotation therewith suitable take-off and take-up reels 18 and 19. The frame 12 is provided with an integrally cast portion 12a, which extends from the bottom edge of the said frame 12 at right angles thereto and is adapted to overlie the top wall 11a of the base 11. Integral with the frame 12 and with the portion 12a is a vertical wall 12b, disposed at right angles to the portion 12a and also to the body of the frame 12, as clearly shown in Figs. 1 and 2. The wall 12b is so constructed and arranged as to serve as one side wall of a lamp house 20, described in our copending application, Serial No. 146,182. The portion 12a of the frame 12 may be fixed to the base 11 by any suitable attaching means, such as for example a plurality of screws 21 passing through the frame portion 12a and received in the threaded holes in the top wall 11a of the base, so that the frame 12 is held rigidly in upright position.

The frame 12 is so designed and constructed that, in addition to supporting the reels 18 and 19, it is adapted to be used as a support for the intermittent film movement mechanism soon to be described and protectively encased in a member 22 removably mounted on said frame, the film sprocket wheels 23 and 24, the lens holder support 25, the film passageway 26, a shutter 27, and a chain of gearing shown in Figs. 2 to 4, for synchronously driving the film movement and the shutter together with the sprocket wheels.

The roll of film F to be projected is contained on the take-off reel 18 and is threaded over the sprocket wheel 23 and formed into a loop, as shown in Fig. 1 of the drawings, after which it is passed through the film passageway 26, and then formed into a second loop, after which it passes over the sprocket wheel 24 and on to the wind-up reel 19. The surface of the frame 12 may be provided with curved ridges 28 and 29, which are adapted to serve as guides for forming the above-mentioned loops in the film F before and after passing through the film passageway 26.

The sprocket wheels 23 and 24 are of customary construction and fixed to the shafts 30 and 31, which in turn are journaled in the brackets 23a and 24a integral with the frame 12. Suitable pairs of guide rods 32 and 33 for guiding the film on to the sprockets 23 and 24 are provided.

The film passageway 26 comprises a longitudinal member 35 disposed parallel to the wall 12b and a cooperating film gate 39.

For intermittently advancing the film through the film passageway 26, we have provided the following novel mechanism, which is clearly illustrated in Figs. 3 and 4.

The film F employed in connection with the projector of our invention is preferably of the 8 mm. type having a single row of perforations P adjacent one edge thereof, but it is understood that a motion picture projector may be constructed in accordance with our invention in which any other type or size of film may be satisfactorily employed. Our improved film movement comprises a film claw 56, which may be an angle-shaped member, as shown, having one leg 56a thereof rigidly attached to a vertically disposed leaf spring 57, normally parallel to the film passageway 26, and the other leg 56b extending outwardly from said spring 57 at an angle thereto. The spring 57 is rigidly attached at the lower end thereof to a shuttle 58, by any suitable attaching means, such as rivets 59. The claw 56 is adapted to be moved toward and away from the film F at a predetermined rate, so that the claw portion 56b will regularly freely enter the perforations P in the film and be withdrawn therefrom. It is understood, of course, that the film F must be intermittently advanced in synchronism with the positioning of each image, and be at rest for a predetermined interval of time while the photographic image on the film is in registered relationship with the usual film apertures (not shown) in the film gate 39 and member 35. To provide this proper synchronism, we employ a cam 80 fixed to a shaft 81 for rotation therewith, said shaft 81 being journalled in a bracket 82 which is integral with the frame 12. The cam 80 may be fixed to the shaft 81 by having a portion 81a of said shaft adjacent the end thereof knurled, and the aperture in the cam 80 correspondingly knurled so that, upon assembly of the cam 80 on the shaft portion 81a, relative rotation between said shaft and cam will be prevented. When the claw portion 56b is in proper alignment with a perforation P, the rotation of the cam 80 will cause the said claw portion 56b to be moved toward the film F to enter the perforation P against the normal action of the spring 57. The mechanism is so designed that, after the claw 56 has entered the perforation P, it is then pulled or moved in a downward direction to advance the film a predetermined amount. When the lowermost position of the claw has been reached, the cam 80 is so designed that it will by that time have released the pressure on the spring 57 to permit the withdrawal of the claw 56 from the perforation P in the film, and the claw will then be free to move upwardly in readiness to again enter another perforation P for a second advancing movement of the film, and so on. To permit the insertion of the point of the claw 56 a sufficient distance in the perforation P, the film gate 39 is provided with a slotted aperture 39b (see Fig. 3) of sufficient size to accommodate the full stroke of the film claw 56.

The vertical reciprocating movement of the claw 56 is produced by means of the shuttle 58, which is slidably mounted for straight-line reciprocation by means of the projecting pins 83 integral with the frame 12, which threadedly receive therein the enlarged head screws 85, said screws 85 being adapted to pass freely through the elongated slots 84. The heads of the screws 85 serve to prevent lateral displacement of the shuttle 58. For causing uniform reciprocation of the shuttle 58 in synchronized relationship with the film claw 56, there is provided a cam 86 adapted to operate in an aperture 87 in the shuttle 58. The cam is fixed to a main shaft 88 which is journalled in a bracket 89 integral with the frame 12. The cam 86 may be frictionally fixed to the shaft 88 by knurling a portion 88a of the said shaft 88 and correspondingly knurling the aperture in the cam 86. Mounted on the main shaft 88 and disposed on the opposite side of the frame 12 from that of the bracket 89, is a pinion 90 which is adapted to mesh with an idler pinion 91 freely rotatably mounted on the shaft 92, which is in turn fixed to the frame 12. The pinion 91 is adapted to mesh with a gear 93 fixed to the shaft 81, which carries the cam 80.

It is thus apparent from the above description that when the main shaft 88 is rotated, the cam 86 will cause straight line vertical reciprocation of the shuttle 58, and at the same time the pinion 90 will cause rotation of the gear 93 through the idler pinion 91, so that the cam 80 will be caused to rotate, which will intermittently urge the claw 56 into engagement with the perforations P against the action of the spring 57, and then, upon continued rotation of the cam 80, the claw 56 will be withdrawn from the perforation P due to the action of the spring 57.

The above-described intermittent film movement mechanism is so designed that the shuttle cam 86 will rotate at twice the speed of the claw feed cam 80, in order that the pull-down period of the claw 56 will be relatively small as compared with its period of rest. In other words, for every two reciprocating cycles of the shuttle 58, there will be one feed cycle of the claw 56. It is noted in the above-described construction that the claw 56 is caused to move toward and away from the film at substantially right angles to the direction of reciprocation of the shuttle 58.

The main shaft 88 is adapted to be driven from any suitable motor, which may be housed in the base 11 by any well known driving means, such as for example a pulley 96 fixed to the main driving shaft 88 for rotation therewith, and a similar pulley on the motor shaft together with a belt interconnecting both pulleys in the manner shown in our said copending application, Serial No. 146,182.

Means are provided, as shown in Figs. 2, 3 and 4, for simultaneously driving the film sprockets 23 and 24 from the main driving shaft 88 in synchronous operation with the film claw movement mechanism above described. For this purpose, we have provided a gear 100 in mesh with the gear 90 on the main shaft 88, said gear 100 being freely rotatably mounted on a shaft 101 fixed to the frame 12. Freely rotatably mounted on the same shaft 101 is a pinion 102 integral with the gear 100 and which is adapted to mesh with a gear 103 fixedly mounted on the shaft 31 for rotation therewith, upon which is also mounted the lower sprocket wheel 24, to cause the rotation of said sprocket wheel 24. On the upper sprocket shaft 30 there is fixed, for rotation therewith, a gear similar in design and function to that of the gear 103 and which is adapted to be driven from the gear 103 by means of an intermediate idler gear 104, freely rotatably mounted on the shaft 105 fixed to the frame 12.

By our invention, we have also provided a construction whereby the chain of gearing for driving the mechanism to operate the projector, which in turn is driven from the main shaft 88, is all enclosed in dust-proof as well as relatively sound-proof housings, which are adapted to be readily accessible for repairs and for necessary adjustment. All of the gearing mechanism hereinbefore described for driving the intermittent film movement of the shutter as well as the sprockets from a main shaft interconnected with the motor is enclosed in a dust-proof housing comprising a surrounding wall 120 integral with the frame 12 and extending at right angles therefrom a predetermined distance sufficient to cover all the above described gearing. It is noted that the portion 12c of the wall 12b forms an integral part of the wall 120. The hollow casing area formed by the surrounding wall 120 is adapted to house the chain of gearing hereinbefore described and to be closed off, as is also shown in our copending application Serial No. 146,182 by a removable cover 121.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In a motion picture projector of the character described, the combination of a supporting frame comprising a vertically disposed wall, a main shaft horizontally disposed and journaled in said wall, intermittent film movement mechanism comprising a reciprocatably mounted shuttle supported by said wall for straight line reciprocation only, a film claw mounted at one end of a leaf spring whose other end is fixed to said shuttle for reciprocation therewith, means for causing reciprocation of said shuttle, said last named means comprising a cam fixed directly to said main shaft, a second shaft journaled in said frame, means for synchronously causing said film claw to travel toward and away from the film when said shuttle is reciprocated, said last named means comprising a cam mounted on said second shaft and adapted to directly actuate said film claw, and means for driving said second shaft from said main shaft, said last named means comprising a gear on said main shaft, a gear on said second shaft, and an intermediate gear meshing with said main and second shaft gears.

2. In a motion picture projector of the character described, the combination of a supporting frame comprising a vertically disposed wall, a main shaft horizontally disposed and journaled in said wall, intermittent film movement mechanism comprising a reciprocatably mounted shuttle supported by said wall for straight line reciprocation only, a film claw mounted at one end of a leaf spring whose other end is fixed to said shuttle for reciprocation therewith, means for causing reciprocation of said shuttle, said last named means comprising a cam fixed directly to said main shaft, a second shaft journaled in said frame, means for synchronously causing said film claw to travel toward and away from the film when said shuttle is reciprocated, said last named means comprising a cam mounted on said second shaft and adapted to directly actuate said film claw, and means for driving said second shaft from said main shaft, said last named means comprising a gear on said main shaft, a gear on said second shaft, and an intermediate gear meshing with said main and second shaft gears, said shuttle, said film claw, said main and second shaft cams being disposed on one side of said wall, and said gears being disposed on the opposite side of said wall.

3. In a motion picture projector of the character described, the combination of a supporting frame comprising a vertically disposed wall, a main shaft horizontally disposed and journaled in said wall, intermittent film movement mechanism comprising a reciprocatably mounted shuttle supported by said wall for straight line reciprocation only, a film claw mounted at one end of a leaf spring whose other end is fixed to said shuttle for reciprocation therewith, means for causing reciprocation of said shuttle, said last named means comprising a cam fixed directly to said main shaft, a second shaft journaled in said frame, means for synchronously causing said film claw to travel toward and away from the film when said shuttle is reciprocated, said last named means comprising a cam mounted on said second shaft and adapted to directly actuate said film claw, and means for driving said second shaft from said main shaft, said last named means comprising a gear on said main shaft, a gear on said second shaft, and an intermediate gear meshing with said main and second shaft gears, said shuttle, said film claw, said main and second shaft cams being disposed on one side of said wall, and said gears being disposed on the opposite side of said wall, and a member removably mounted on said wall for protectively encasing said shuttle, said film claw and said cams.

4. In a motion picture projector of the character described, the combination of a supporting frame comprising a vertically disposed wall, a main shaft horizontally disposed and journaled in said wall, intermittent film movement mechanism comprising a reciprocatably mounted shuttle supported by said wall for straight line reciprocation, a film claw mounted at one end of a leaf spring whose other end is fixed to said shutter for reciprocation therewith, means for causing reciprocation of said shuttle, said last named means comprising a cam fixed directly to said main shaft, a second shaft journaled in said frame, means for synchronously causing said film claw to travel toward and away from the film when said shuttle is reciprocated, said last named means comprising a cam mounted on said second shaft and adapted to directly actuate said film claw, means for driving said second shaft from said main shaft, said last named means comprising a gear on said main shaft, a gear on said second shaft, and an intermediate gear meshing with said main and second shaft gears, said shuttle, said film claw, said main and second shaft cams being disposed on one side of said wall, and said gears being disposed on the opposite side of said wall, and a housing for said gears, said housing comprising an auxiliary wall surrounding said gears integral with and disposed at right angles to said first named wall, a removable cover member for protectively encasing said gears, a portion of said main shaft projecting through said cover member, and a pulley on said projecting main shaft portion adapted to drive the same.

5. In a motion picture projector of the character described, the combination of a supporting frame comprising a vertically disposed wall, a main shaft journaled in said wall, an auxiliary shaft journaled in said wall, a cam mounted on each of said shafts for rotation therewith, a reciprocatable shuttle having an opening operatively receiving said main shaft cam therein, said shuttle being adapted to move in a plane parallel to the plane of said wall, vertically disposed slotted apertures in said shuttle, pins fixed to said wall freely operating in said slotted apertures to cause straight line reciprocation only, a flat spring member fixed at one end thereof to said shuttle, leaving the opposite end free, said spring member being disposed in a plane at right angles to the plane of said shuttle movement, a film claw fixed to said free end of said spring and adapted to cooperate with a film passageway to advance a film, said spring member being arranged so as to normally urge said film claw to move in a direction away from said film, said auxiliary shaft cam being adapted to intermittently move said film claw in a direction toward said film, and means for synchronizing the movements of said shuttle and said film claw.

6. In a motion picture projector of the character described the combination of a supporting frame comprising a first vertical wall perpendicular to the optical axis of said projector, said wall having a light transmitting aperture therein, and a second vertical wall integral with said first wall and parallel to said optical axis, a main shaft horizontally disposed and journalled in said second wall, means for intermittently advancing a film past said aperture, said means comprising a shuttle reciprocably mounted on a plurality of projections integral with and extending from said second wall, means for causing reciprocation of said shuttle, said last named means comprising a cam fixed to said main shaft, and means for driving said shaft.

OTTO W. GITHENS.
GEORGE KENDE.
EVERETT M. PORTER.